(No Model.)
W. PAINTER.
FOUNTAIN PITCHER.
No. 316,646. Patented Apr. 28, 1885.
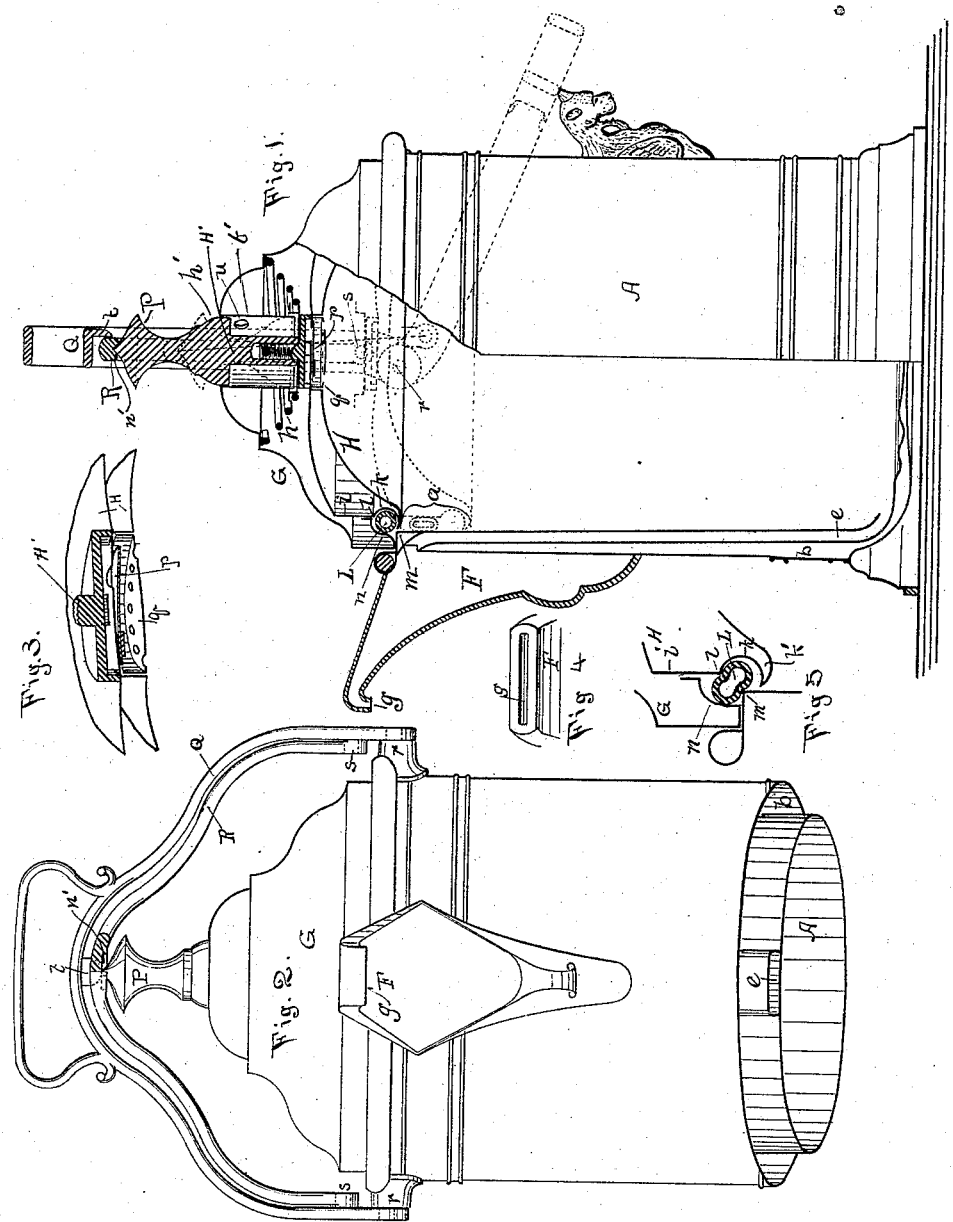
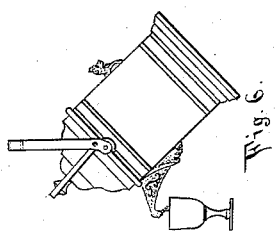
WITNESSES:
R. W. Smith
J. C. Turner
INVENTOR
Wm Painter
BY
R. D. Smith
his ATTORNEY
N. PETERS, Photo-Lithographer, Washington, D. C.

UNITED STATES PATENT OFFICE.

WILLIAM PAINTER, OF BALTIMORE, MARYLAND.

FOUNTAIN-PITCHER.

SPECIFICATION forming part of Letters Patent No. 316,646, dated April 28, 1885.

Application filed November 25, 1884. (No model.)

*To all whom it may concern:*

Be it known that I, WILLIAM PAINTER, of Baltimore, in the county of Baltimore and State of Maryland, have invented a new and useful Improvement in Fountain-Pitchers, applicable to dispensing ice-water and other beverages, of which the following is a specification.

My invention relates to that class of fountain-pitchers in which the liquid contents are discharged by air-pressure temporarily applied for the purpose; and it consists, primarily, of a cylindrical receptacle having a piston adapted to work air-tight within it, means for actuating said piston, and an elevated duct through which the contents of the vessel are discharged; and in connection therewith it consists, first, in a piston normally located above the cylindrical body of the pitcher, and capable of being depressed so as to enter the same and compress the inclosed air upon the surface of the liquid, and thereby cause it to rise in and be discharged from the elevated duct; second, in a piston having double walls and inclosed air-space; third, in providing said piston with an elastic rolling packing-ring, which is capable of passing over the edge of and down into the cylinder; fourth, in confining said packing-ring in a groove or recess in the piston, within which recess said packing-ring normally rests without pressure to distort its form; fifth, in providing said piston with a lever whereby it may be depressed at will; sixth, in a swinging bail or handle by which the pitcher may be carried, said handle serving also as a lever for actuating the piston; seventh, in a yoke pivoted to said bail and engaging with the piston; eighth, in causing said bail and yoke to assume a vertical position by the action of the piston-spring; ninth, in a knob and spindle attached to the piston and a tubular guide for said spindle; tenth, in a cover which contains and conceals the piston, packing-ring, and lifting-spring, and sustains the piston central with the cylinder; eleventh, in a discharge orifice or nozzle in the form of a long narrow slit, in which capillary attraction holds the residual drops; also, in certain other features of construction, hereinafter described.

The several parts of my invention above named I regard as distinct features, each of which may be independently varied without interfering with the others.

In the drawings, Figure 1 is a side elevation, partly in section; Fig. 2, a front elevation, partly in section; Figs. 3, 4, and 5, details of construction; and Fig. 6, a perspective showing the action while held in the hand by the bail and tilted.

While my invention is applicable to other uses—such as coffee, wines, &c.—the drawings show it adapted to an ice-pitcher, and the accompanying description refers to the invention in that form.

The pitcher-body A is made of any desired form, and has the usual double walls and air-space, *b*. A duct, *e*, communicates with the inner cylinder at the bottom, and extends thence upward between the two walls, discharging at or above the level of the top of the pitcher. In the drawings the duct *e* is shown as discharging into the spout F, which, when full, in turn discharges through the narrow nozzle *g*, though it is evident the duct *e* may be continued over to the outlet *g*, if desired.

The cover or lid G rests upon the rim of the pitcher, and has within it a piston, H, which is normally held in its highest position, preferably entirely above the top of the cylinder, by a spring, *h*. The cover may be hinged, but the drawings show it without.

The piston is made with double walls and inclosed air-space, like the body of the pitcher, and has a cylindrical portion, *i*, which is in practice about three-eighths of an inch less in diameter than the interior cylinder of the pitcher. At its lower edge is a recess, K, and a packing-ring, L, of some elastic material is placed therein. This ring is preferably made of rubber and hollow, so as to be soft, yielding, and easily compressed. It may be coated with a thin film of gutta-percha, pure rubber, (without sulphur,) or other material, to prevent tarnishing of the silver-plating by the sulphur contained in the rubber.

When the piston H is depressed, the ring L is caught and compressed between the shoulder *l* of the piston above the recess K and the edge *m* of the cylinder, as shown in Fig. 5, and is thereby flattened and rolled downward, being compressed between the piston H and the cylinder *a*, as shown in Fig. 1, forming an air-tight joint, the ring being capable of passing over the joint between the cylinder *a* and the cover G.

The inner rim of the cover G has a recess, $n$, which insures the return of the packing-ring L to its proper place in the recess K. A further office of recess $n$ is to sustain the ring L and piston H in central position with respect to the cover G and to the cylinder $a$.

In Fig. 5, $k'$ is a rim or lip extending around the lower edge of the piston. Its object is to conceal the ring L, as shown in Fig. 1, and also to prevent its accidental displacement from the piston.

The structure of the several parts described enables the ring L to be held in normal or initial position without pressure from any direction. It can therefore never become flattened or distorted, retains its form and elasticity, and thereby insures at all times a perfectly air-tight joint.

An air-valve, $p$, Fig. 3, is placed in the top of the piston H to admit air when it rises. It is convenient to make this valve of a strip of rubber, which, for concealment, is covered with a perforated cap, $q$.

H' is a spindle attached to the piston H, and passing through the cover G. Near the center of its length is an enlargement, $h'$, fitting snugly in the guiding-tube $t'$, which is attached to the cover, as shown. The spindle, which may be of any desired shape, terminates in a knob, P. All portions of the spindle between the knob P and the enlargement $h'$ are of smaller diameter than the enlargement. The object of this is to admit of varied ornamental forms and graceful proportions of the spindle, while avoiding abrasion of its visible surface when the knob and piston are depressed. The only part of the spindle that is subject to friction and abrasion is within the tube, and at all times concealed from view. This would not be the case if the spindle were in the form of a plain cylindrical rod passing through and guided by a narrow ring or collar at the top of the cover, as will be readily understood.

It is evident that if sufficient pressure be applied by the hand directly on the knob P it will depress the piston and expel through the duct $e$ a portion of the contents of the pitcher. This is practicable when the pitcher or other vessel is of small size and little force is required; but for ice-pitchers of usual size the force necessary is too great to be conveniently exerted on the knob directly. It is therefore expedient to employ leverage in some form, and a variety of ways are available. I regard as the most practical method, and the one lending itself most readily to graceful forms and attractive appearance, actuating the piston by a bail, Q, which is pivoted to the sides of the pitcher, near its upper edge and slightly in advance of the median line, as at $r\ r$, the ends of the bail being curved, as shown, so as to bring the bail central with the pitcher when in a vertical position.

R is the yoke, of the same general shape as the bail Q, pivoted within and to it at $s\ s$, near to the joint $r$, but on the median line of the pitcher and central with the bail Q. The yoke R has a groove or notch, with which the conical end of the knob P engages, being held in said groove by the action of the piston-spring.

Several important objects are accomplished by pivoting the bail Q out of the center, as described. The necessary leverage is obtained, while both the bail and yoke are held central with the pitcher. The action of the yoke upon the knob, as shown in dotted lines, Fig. 1, and also in Fig. 6, is very direct, avoiding side strain and friction, and the preponderating weight of the spout F and duct $e$ are balanced, the pitcher hanging plumb when carried by the bail Q.

To discharge a glass of water from the pitcher, the bail Q is turned backward, as shown in dotted lines, Fig. 1. The yoke R and knob P are thereby carried down and the piston depressed, compressing the air in the cylinder and expelling the water. When the bail Q is released, the spring $h$ causes the piston to ascend, carrying upward, through the medium of the spindle, the yoke and bail, as will be readily understood. When at its highest position, the piston is above and clear of the cylinder $a$, as shown, so that the cover G with the piston may be removed from the pitcher without obstruction when desired.

The location of the centers $r\ r$ and $s\ s$ out of line with each other enables the spring $h$ to actuate the bail Q until it has reached its upright position, and would carry it over and beyond that point were it not for the stop $t$ on the bail Q, by which it is arrested by contact with the yoke R when the proper vertical position is reached. This arrangement of parts causes the bail Q to be held firmly in vertical position ready for action, and at the same time the cover G is held securely on the pitcher, whether the bail is in action or not. The pitcher may even be tilted to any degree, as in Fig. 6, without possibilty of displacing the cover.

By slightly depressing the knob P and releasing it from its notch $n'$ in the yoke the bail and yoke may be freely moved either to the front or back of the pitcher and the cover lifted off. To replace it the knob is slightly depressed, allowing it to enter the notch in the yoke. The bail is thus sustained in its proper position.

The bail Q is provided at its top with a hand-hold, as shown, by which the pitcher is carried. The form and position of handle, as described, are much more convenient in carrying than the usual one at the rear of the pitcher, because the weight of the pitcher and contents hangs vertically from the hand. An ornamental stop at the rear of the pitcher limits the movement of the bail.

An air-vent, $u$, in the guiding-tube $t'$ allows free passage of air into and from the space between the piston H and cover G while the piston is in action.

The general form of the interior cylinder is, as usual, slightly tapering to facilitate its manufacture; but it should be straight for a short distance at top, as at *a*, to permit the rolling of the packing-ring L.

A porcelain lining, instead of the ordinary metallic one, may be used, the piston with its rolling packing-ring working equally well in such case.

The discharge-orifice *g* must necessarily have vertical walls for a short distance to give direction to the issuing stream, and the drip from such aperture has always been a source of annoyance. To obviate it I make the orifice in the form of a narrow slit, wherein capillary attraction will retain the residual drops instead of permitting them to drip. The proper width of the aperture is about one-eighth of an inch, and the desired area is attained by giving it the necessary length. Fig. 4 shows an enlarged view of the discharge-orifice. Small holes will answer a similar purpose to the narrow slot; but they will be liable to become clogged.

It is sometimes desirable to fill from the pitcher a glass held in another person's hand. This is very conveniently done by holding the pitcher in one hand, suspended by the bail, and tilting it by taking the lower rim of the pitcher in the other hand. The act of tilting causes the piston to be depressed and the water to be expelled, the cover meantime being prevented from falling off by engagement of the yoke with the knob, regardless of how much the pitcher may be tilted. Fig. 6 shows the action in this case.

By my method of constructing and operating the various parts, as described, a very efficient, convenient, durable, and graceful fountain-pitcher is produced, the several objects in view being accomplished without complication or undue cost, while the pitcher is simple, easily understood, not liable to derangement, and conveniently operated, either while standing or held in the hand.

The use of the elastic rolling packing-ring gives a reliable and positively air-tight joint, almost entirely frictionless in action, and therefore requiring but slight force to operate it. It avoids wear both of the packing and cylinder, is not obstructed by bits of straw or other substance occurring in ice-water, cannot become set or distorted, and consequently ineffective, is not liable to displacement from the piston, and avoids discoloration of the silver-plating of the pitcher or the imparting of taste or odor to the water.

The pivoted bail and yoke afford a convenient, easy, and efficient means for operating the piston, transmitting the necessary force in a very direct line, thus avoiding friction and wear, the bail at the same time furnishing a convenient means for carrying and handling the pitcher. This construction of the lever mechanism admits of very graceful forms, and avoids the use of conspicuous projecting or unsightly levers or other parts.

The need of the usual hinging of the cover and the attendant danger of the breaking of the hinges are avoided, while the cover is held securely in place while the pitcher is in use. The entire removal of the cover gives easy access in filling and cleansing the pitcher, while in replacing the cover it is not necessary to turn it into any particular position, owing to its symmetrical form.

I claim—

1. In a fountain-pitcher, the combination of a cylindrical receptacle, a piston working air-tight therein for compressing the air in the cylinder, and an elevated duct through which the contents of the pitcher are discharged, substantially as described.

2. In a fountain-pitcher, the combination of a cylinder, a piston supported normally above said cylinder but capable of movement down into it, and an inclosing casing or guide for sustaining said piston central with the cylinder, substantially as described.

3. In a fountain-pitcher, a cylinder, a piston adapted to work air-tight therein, and a retracting-spring for withdrawing said piston from the cylinder, substantially as described.

4. In a fountain-pitcher, a cylinder and a piston cylindrical for a portion of its length, and having a recess, as described, in combination with an elastic packing-ring resting normally in said recess, whereby the ring is relieved from pressure when not in action, substantially as described.

5. The recessed piston and elastic packing-ring, combined with a stationary recessed cover, whereby upon the receding of the piston within the cover the said packing-ring is forced to return to its seat in the recess of said piston, substantially as and for the purposes set forth.

6. The piston, with its packing-ring, substantially as described, in combination with a valve for admitting air beneath said piston, as set forth, and an inclosing-case to support said piston and valve.

7. A double-walled piston, in combination with an inclosure for supporting and a spring for retracting the same, substantially as described.

8. In combination with the piston, recess, and packing-ring, the lip or flange adjacent to said recess, whereby the ring is prevented from becoming displaced from the piston, and at the same time said ring is concealed from view, substantially as set forth.

9. A cylindrical vessel, a cover for the same having within it a piston whose normal position is above the top of said cylinder, and a spindle for operating said piston, combined with a lever adapted to depress the spindle and piston, substantially as set forth.

10. A cylindrical vessel provided with a piston and a spindle extending therefrom, combined with a bail and a yoke which engages with said spindle, whereby when the bail is caused to swing upon its pivots the piston will be depressed, substantially as and for the purpose set forth.

11. A cylindrical vessel provided with a piston, retracting-spring, and spindle, in combination with a bail pivoted to said vessel, and a yoke pivoted to said bail and engaging with the piston and spindle, substantially as described, whereby the piston is depressed, and on releasing the bail the spring causes said bail to return to a vertical position, as set forth.

12. In a fountain-pitcher provided with an air-compressing device, a bail pivoted to said pitcher and connected with the air-compressing device, whereby the movement of the bail on its pivots actuates said air-compressing device and discharges the contents of the pitcher, substantially as set forth.

13. A fountain-pitcher provided with an air-compressing device, in combination with a lever for actuating said air-compressing device, said lever being adapted as a handle for carrying the pitcher, substantially as described.

14. A fountain-pitcher having a cover and an air-compressing device inclosed therein, in combination with a lever pivoted to said pitcher, and connected with the air-compressing device and adapted to retain the cover in place on the pitcher, substantially as described.

15. The piston, the cover inclosing the same, and the guiding-tube attached to said cover, in combination with the spindle having its bearing entirely within said guiding-tube, whereby the wearing-surface is concealed, substantially as described.

16. The retracting-spring, spindle, yoke, and bail pivoted out of line, as described, in combination with a stop attached to said bail for limiting its movement by contact with the yoke, whereby the yoke and bail are held by the action of the spring in line with each other and in vertical position, substantially as described.

17. In combination with the bail, yoke, spindle, and retracting-spring, the retaining notch or recess in said yoke for engagement with the spindle, as and for the purposes described.

18. The discharge-aperture in the form of a narrow slit, whose sides approach so near that the residual drops of liquid will be retained therein by capillary attraction and dripping prevented, substantially as set forth.

WILLIAM PAINTER.

Witnesses:
CHARLES A. BOND,
ORRIN C. PAINTER.